(12) United States Patent
Usui

(10) Patent No.: US 6,625,468 B1
(45) Date of Patent: Sep. 23, 2003

(54) DIGITAL PORTABLE TELEPHONE UNIT AND METHOD FOR PLAYING BACK VOICE/SOUND IN THE SAME UNIT

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 09/592,172

(22) Filed: Jun. 12, 2000

(30) Foreign Application Priority Data

Jun. 16, 1999  (JP) .......................................... 11-169355

(51) Int. Cl.[7] ............................... H04B 1/38; H04B 1/26
(52) U.S. Cl. .................... 455/550; 455/226.2; 455/207; 455/313; 455/314; 455/423; 375/316
(58) Field of Search ................................ 455/550, 67.1, 455/425, 423, 412, 226.2, 207, 209, 313, 314; 375/316

(56) References Cited

U.S. PATENT DOCUMENTS 5,461,646 A  * 10/1995  Anvari ........................ 375/347
5,617,451 A     4/1997  Mimura et al.
5,875,388 A  *  2/1999  Daughtry, Jr. et al. ..... 455/67.1

FOREIGN PATENT DOCUMENTS

| JP | 6-54009 | 2/1994 |
|----|---------|--------|
| JP | 6-54012 | 2/1994 |
| JP | 6-140971 | 5/1994 |
| JP | 6-164663 | 6/1994 |
| JP | 7-322354 | 12/1995 |
| JP | 7-336404 | 12/1995 |
| WO | WO95/18486 | 7/1995 |

* cited by examiner

Primary Examiner—Vivian Chin
Assistant Examiner—Eugene Yun
(74) Attorney, Agent, or Firm—Scully, Scott, Murphy & Presser

(57) ABSTRACT

A digital portable telephone unit of the invention is equipped with: an antenna through which signal is transmitted and received; a radio section which conducts the frequency conversion of signal and outputs IF (intermediate frequency) and RSSI (receive signal strength indicator); a demodulation section which demodulates the IF to output receive data; an A/D converter which outputs digitalizing the voltage of RSSI; and a control section which receives the receive data and outputs audio signal. The demodulation section outputs a trigger to indicate a symbol point of RSSI to the A/D converter.

8 Claims, 4 Drawing Sheets

DIGITAL PORTABLE TELEPHONE UNIT AND METHOD FOR PLAYING BACK VOICE/SOUND IN THE SAME UNIT

FIELD OF THE INVENTION

This invention relates to a digital portable telephone unit suited to play back excellent voice/sound and a method for playing back voice/sound in the digital portable telephone unit.

BACKGROUND OF THE INVENTION

In order to play back excellent voice/sound in digital portable telephone units, it is necessary to measure precisely RSSI (receive signal strength indicator) to each symbol point.

FIG. 1 shows an example of conventional digital portable telephone unit trying such a RSSI measurement.

As shown in FIG.1, receive signal received by an antenna 101 is selected at a desired receive frequency, frequency-converted and amplified by a radio section 102. Then, IF (intermediate frequency) 127 and RSSI (receive signal strength indicator) are output from the radio section 102 to a demodulation section 103.

IF 127 output to the demodulation section 103 is demodulated and then output, as receive data, to an A/D converter 114. The A/D converter 114 digitalizes RSSI voltage of RSSI 127a and then outputs it.

Concurrently, a control section 109 processes the receive data and outputs voice/sound signal. Also, the control section 109 uses the digitalized RSSI 127a for the control of phone-call connection. Voice/sound signal processed by the control section 109 is then converted into analogue signal by an audio processing section 106, and then is output from a receiver 113.

On the other hand, voice/sound input from a microphone 112 is converted into digital signal by the audio processing section 106. The control section 109 conducts the processing to process the voice/sound digital signal into transmit data. After that processing, the transmit data signal is modulated by the radio section 102, into carrier wave with a normal frequency. Then, the carrier-wave signal with the normal frequency is amplified by the radio section 102, and then is transmitted through the antenna 101.

Meanwhile, an operation section 110 controls the user interface to send contents of instruction such as a phone number etc. from the user to the control section 109. Also, a display section 111 displays various information such as a received phone number etc. A CLK section 105 generates a clock for timing processing, time display etc. A reference oscillator 108 generates a reference frequency used in generating frequency at the radio section 102 and a precise frequency used in the control section 109 and the demodulation section 103.

An AFC (automatic frequency control) section 104 controls the reference oscillator 108 to coincide with a precise received frequency of base station.

FIG.2 shows the detailed composition of the demodulation section 103.

In digital portable telephone units, π/4 shift DQPSK is used as modulation system. In modulation, delay detection system is used.

Thus, IF 127 from the radio section 102 is output as phase DATA 129 at a timing of symbol CLK 132 by a phase detection section 121 which operates using a reference frequency of 14.4 MHz 128 as a clock.

A DATA playback section 122 produces demodulated data 133 from the phase DATA 129 and outputs it. Also, a phase correction section 123 makes a phase correction based on the phase DATA 129, and outputs a phase-corrected IF 127 to be used at the AFC section 104 as corrected output 130.

A demodulation CLK section 125 outputs a demodulation CLK of 2.68 MHz 134 to a CLK regenerative section 124. Here, between the demodulation CLK section 125 and the CLK regenerative-section 124 is composed as a PLL (phase-locked loop) circuit.

The CLK regenerative section 124 outputs symbol CLK 132 (21 kHz) obtained dividing 2.68 MHz demodulation CLK 134 by 128 and DATA CLK (42 kHz) 131 obtained dividing it by 64.

Also, the phase timings of symbol CLK 132 and DATA CLK 131 are adjusted according to the difference in the amount of phase shift between first-half and second-half symbol sections of phase DATA 129, so that they are made to coincide with the symbol timing of IF signal 127.

Meanwhile, as a system to decode encoded audio data more excellently, a method of incorporating RSSI as a factor of decoding operation is known.

In this case, it is necessary to measure precisely RSSI to each symbol point of receive signal digital-modulated.

Here, the π/4 shift DQPSK is characterized in that the signal level at each symbol point becomes constant, however, between symbol points, the signal level varies depending on data values modulated.

So, in order to measure precisely RSSI to each symbol point, it is important to measure the signal level at a precise timing of symbol point.

SUMMARY OF THE INVENTION

Accordingly, it is an object of the invention to provide a digital portable telephone unit that offers an excellent playback of voice/sound by measuring signal level precisely at a timing of symbol point.

It is a further object of the invention to provide a method for playing back voice/sound that offers an excellent-playback of voice/sound by measuring signal level precisely at a timing of symbol point.

According to the invention, a digital portable telephone unit, comprises:
- an antenna through which signal is transmitted and received;
- a radio section which conducts the frequency conversion of signal and outputs IF (intermediate frequency) and RSSI (receive signal strength indicator);
- a demodulation section which demodulates the IF to output receive data;
- an A/D converter which outputs digitalizing the voltage of RSSI; and
- a control section which receives the receive data and outputs audio signal;
- wherein the demodulation section outputs a trigger to indicate a symbol point of RSSI to the A/D converter.

According to another aspect of the invention, a method for playing back voice/sound, comprises:
- first step of conducting the transmission/reception of signal;
- second step of conducting the frequency conversion of signal and outputting IF (intermediate frequency) and RSSI (receive signal strength indicator);

third step of demodulating the IF to output receive data;

fourth step of outputting digitalizing the voltage of RSSI;

fifth step of processing the receive data to output audio signal; and sixth step of outputting a trigger to indicate a symbol point when digitalizing the voltage of RSSI.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
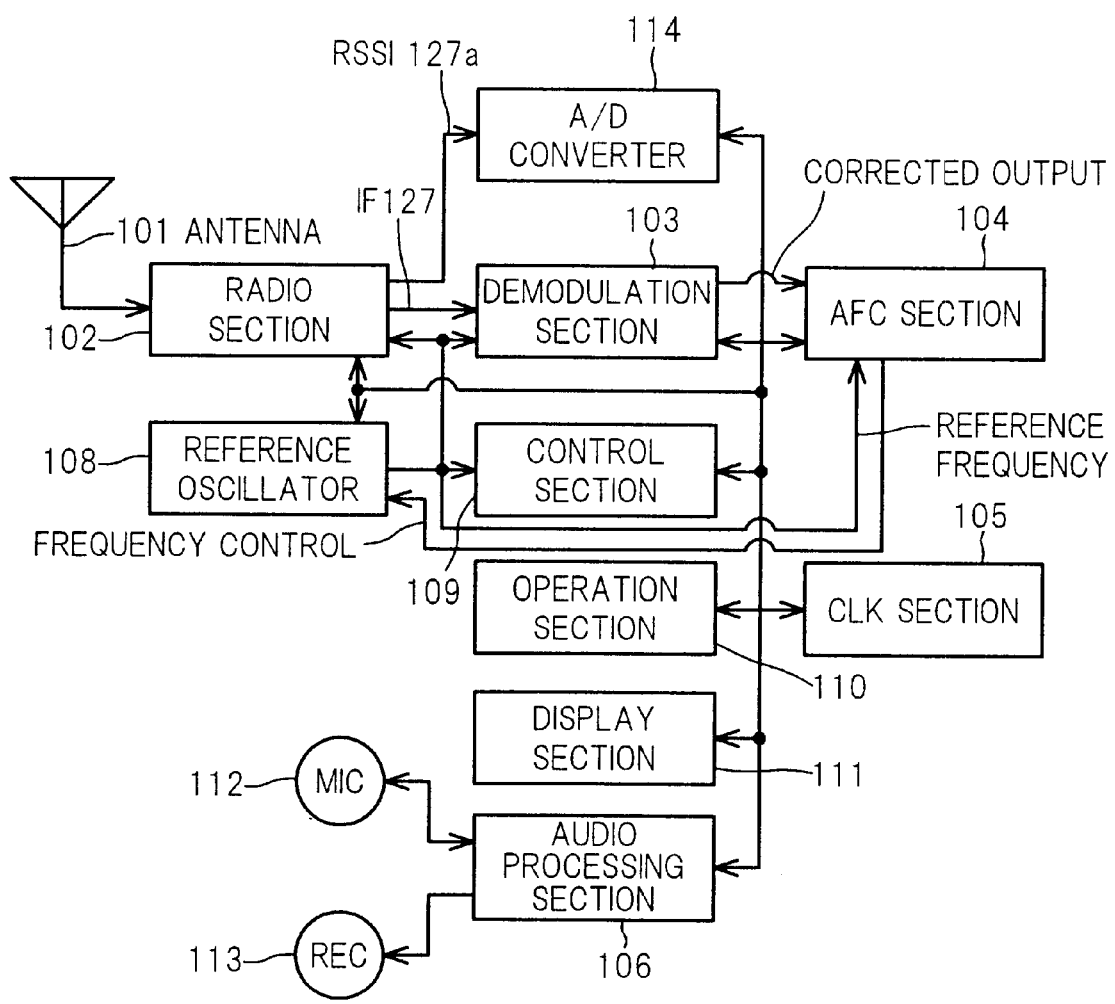
FIG. 1 is a block diagram showing the conventional digital portable telephone unit.

The preferred embodiment of the invention will be explained below. In the drawings referred to below, like parts are indicated by like reference numerals as used in FIGS. 1 and 2.

Figure 3:
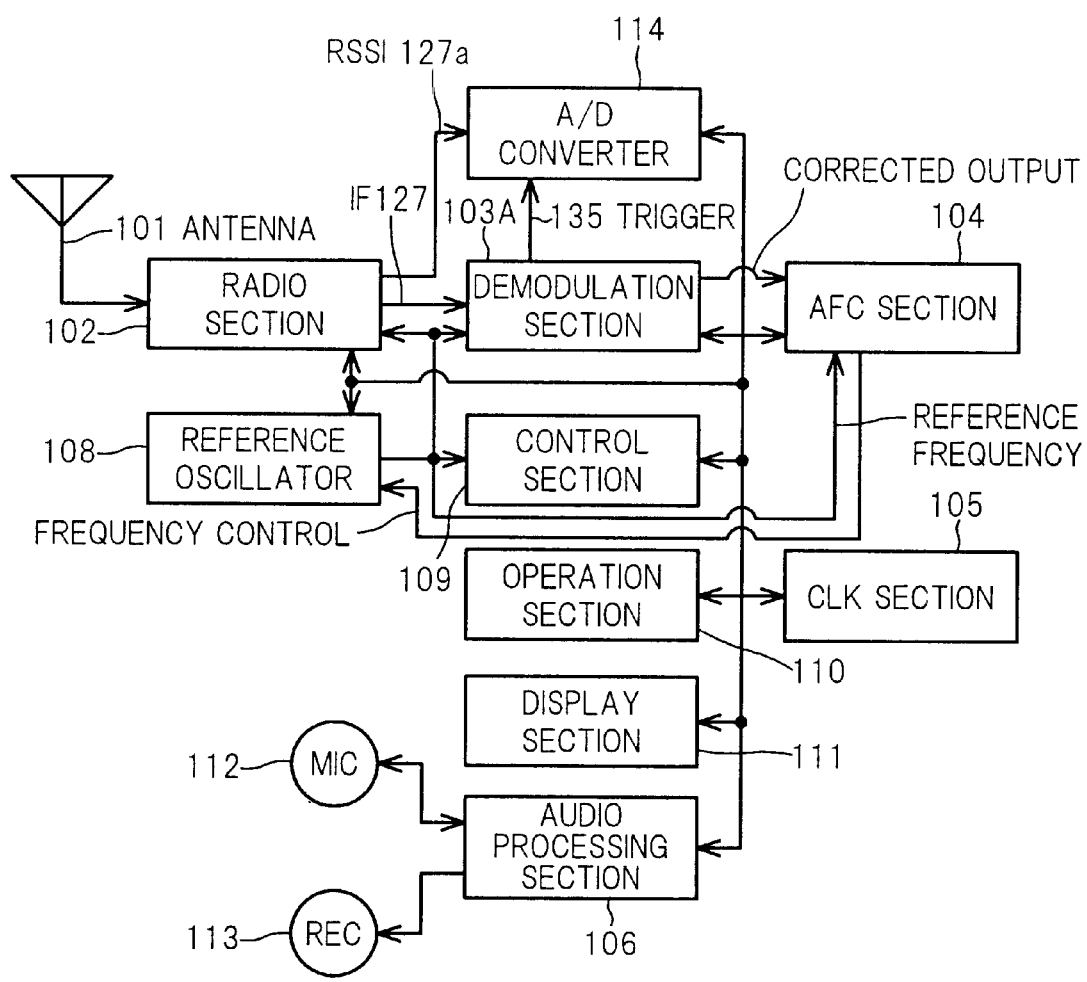
FIG. 3 is a block diagram showing a digital portable telephone unit in a preferred embodiment according to the invention.
Figure 4:
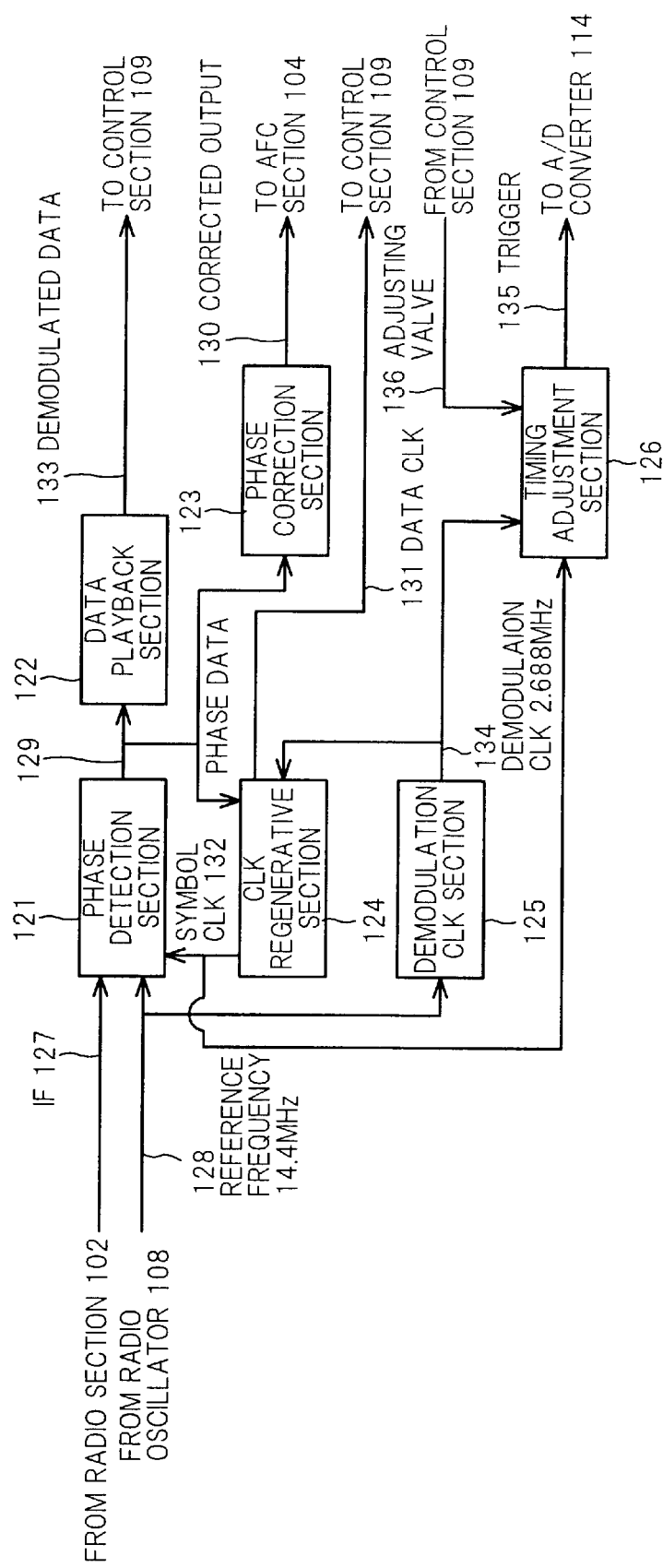
FIG. 4 is a block diagram showing the details of a demodulation section in FIG. 3.

FIG. 3 is a block diagram showing a digital portable telephone unit in the preferred embodiment according to the invention. FIG. 4 is a block diagram showing the detailed composition of a demodulation section in FIG. 3.

In FIG. 3, the digital portable telephone unit comprises an antenna 101, a radio section 102, the demodulation section 103A, an A/D converter 114, an AFC section 104, a CLK section 105, an audio processing section 106, a reference oscillator 108, a control section 109, an operation section 110, a display section 111, a microphone 112 and a receiver 113.

Figure 2:
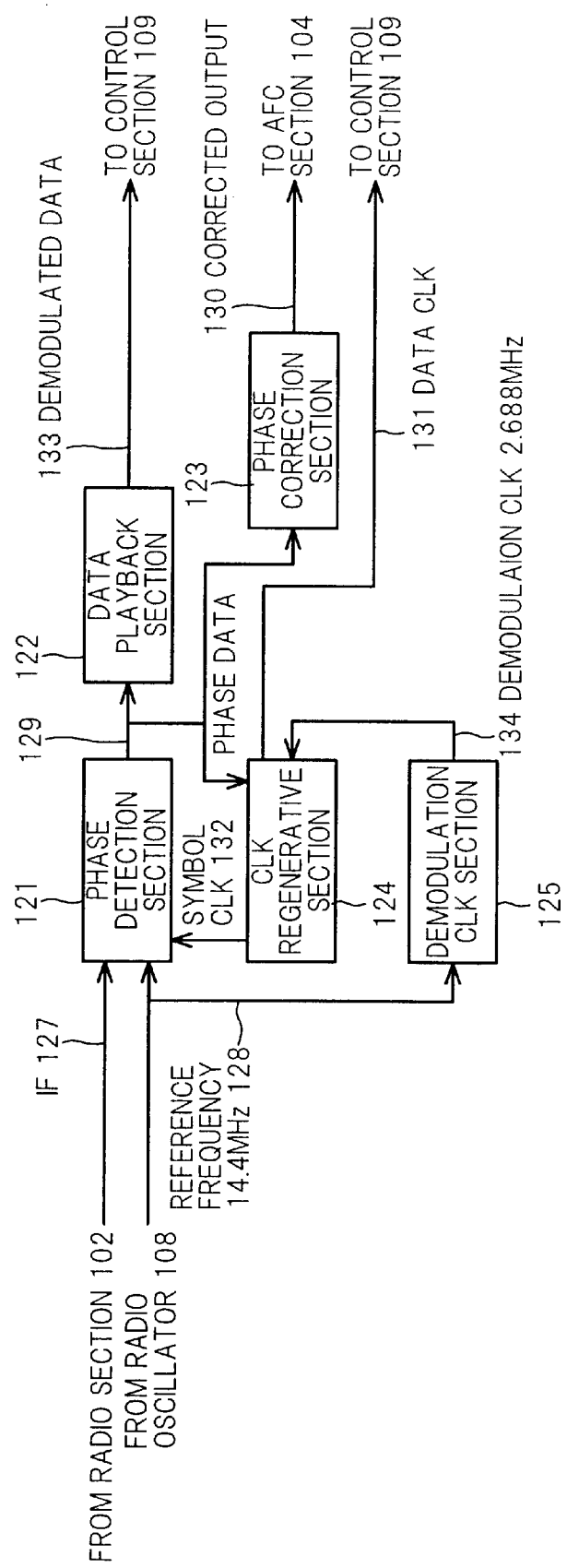
FIG. 2 is a block diagram showing the details of demodulation section in FIG. 1.

Here, a point different from the composition in FIG. 1 is that a trigger to indicate a symbol point of RSSI is output from the demodulation section 103A to the A/D converter 114. The details are explained later.

The antenna 101 transmits/receives signal. The radio section 102 selects a frequency of receive signal desired, converts the frequency, and after amplifying, outputs IF 127 and RSSI 127a. Also, the radio section 102 modulates transmit data processed by the control section 109, amplifies it as carrier wave with a normal frequency, and transmits it through the antenna 101.

The demodulation section 103A demodulates the IF 127 and outputs receive data. The A/D converter 114 outputs digitalizing the RSSI voltage of RSSI 127a. At this time, the trigger to indicate a symbol point of the RSSI 127a is output from the demodulation section 103A to the A/D converter 114.

The control section 109 processes receive data and then outputs voice/sound signal. Also, the control section 109 uses the digitalized RSSI 127a for the control of phone-call connection. Further, the control section 109 processes signal from the audio processing section 106 into transmit data.

The audio processing section 106 converts voice/sound signal into analogue signal to output voice/sound from the receiver 113. The microphone 112 takes in voice/sound. The audio processing section 106 converts voice/sound input from the microphone 112 into digital signal.

The operation section 110 controls the user interface to send contents of instruction such as a phone number etc. from the user to the control section 109. The display section 111 displays various information such as a received phone number etc.

The CLK section 105 generates a clock for timing processing, time display etc. The reference oscillator 108 generates a reference frequency used in generating frequency at the radio section 102 and a precise frequency used in the control section 109 and the demodulation section 103.

The AFC (automatic frequency control) section 104 controls the reference oscillator 108 to coincide with a precise received frequency of base station.

FIG. 4 shows the detailed composition of the demodulation section 103A.

The demodulation section 103A uses delay detection system. Meanwhile, the modulation system of the digital portable telephone unit uses π/4 shift DQPSK.

The demodulation section 103A comprises a phase detection section 121, a DATA playback section 122, a phase correction section 123, a CLK regenerative section 124, a demodulation CLK section 125 and a timing adjusting section 126.

The phase detection section 121, which operates using a reference frequency of 14.4 MHz 128 as a clock, outputs the phase of IF 127 from the radio section 102 as phase DATA 129 at a timing of symbol CLK 132.

The DATA playback section 122 produces demodulated output 133 from the phase DATA 129 and outputs it. The phase correction section 123 makes a phase correction based on the phase DATA 129, and outputs a phase-corrected IF 129 to be used at the AFC section 104 as corrected output 130.

The demodulation CLK section 125 outputs a demodulation CLK 10 of 2.68 MHz 134 to the CLK regenerative section 124. The CLK regenerative section 124 outputs symbol CLK 132 (21 kHz) obtained dividing 2.68 MHz demodulation CLK 134 by 128 and DATA CLK (42 kHz) 131 obtained dividing it by 64. Here, between the demodulation CLK section 125 and the CLK regenerative section 124 is composed as a PLL (phase-locked loop) circuit.

The timing adjusting section 126 takes in symbol CLK 132 and demodulation CLK 134. Also, the timing adjusting section 126 takes in an adjusting value 136 that is stored in the control section 109.

Further, the timing adjusting section 126 starts counting at a rise of symbol CLK 132 so as to count demodulation CLK 134 by a number corresponding to the adjusting value 136 designated by the control section 109. After finishing the count, it outputs the trigger 135 to the A/D converter 114.

The operation of the digital portable telephone unit thus composed is explained below.

At first, signal received by the antenna 101 in FIG. 3 is selected at a desired frequency of receive signal, frequency-converted and amplified by the radio section 102. Then, IF (intermediate frequency) 127 and RSSI (receive signal strength indicator) are output from the radio section 102.

The IF 127 output is demodulated by the demodulation section 103A and then is output as receive data. The receive data output is digitalized by the A/D converter 114 into RSSI voltage, which is then output therefrom.

Then, the digitalized receive data is processed by the control section 109 and is output as voice/sound signal therefrom. Here, the control section 109 uses the digitalized RSSI 127a for the control of phone-call connection. The voice/sound signal output is then converted into analogue signal by an audio processing section 106, and is output from the receiver 113.

On the other hand, voice/sound input from the microphone 112 is converted into digital signal by the audio processing section 106. The digital signal converted is processed into transmit data. The transmit data processed is modulated into carrier wave with a normal frequency by the radio section 102 and is then amplified. Then, the signal amplified is transmitted through the antenna 101.

The operation of the demodulation section 103A is explained below.

At first, as shown in FIG. 4, IF 127, which is receive signal, is taken in the phase detection section 121. The phase detection section 121, which operates using a reference, frequency of 14.4 MHz 128 as a clock, outputs the phase of IF 127 as phase DATA 129 at a timing of symbol CLK 132.

The phase DATA 129 output is output as demodulated data 133 from the DATA playback section 122. Also, the phase DATA 129 output is subject to a phase correction by the phase correction section 123, thereby a phase-corrected IF 127 to be used at the AFC section 104 is output as corrected output 130.

Here, the demodulation CLK section 125 outputs a demodulation CLK 134. The demodulation CLK 134 output is output as symbol CLK 132 divided by 128 and DATA CLK 131 divided by 64 from the CLK regenerative section 124.

Also, the phase timings of symbol CLK 132 and DATA CLK 131 are adjusted according to the difference in the amount of phase shift between first-half and second-half symbol sections of phase DATA 129. Thereby, they are made to coincide with the symbol timing of IF 127.

In order to measure precisely RSSI to each symbol point, the CLK regenerative section 124 outputs, as symbol CLK 132, the precise timing of symbol point of IF 127 output from the radio section 102.

Meanwhile, the IF 127 and RSSI 127a which are output from the radio section 102 in FIG. 3 have delay times different each other. Therefore, the timing of symbol points of IF 127 and RSSI 127a is differentiated.

However, the timing of these symbol points has a certain time interval. Therefore, the timing adjusting section 126 produces a timing by using that characteristics.

Namely, a rise of symbol CLK 132 in FIG. 4 corresponds to the timing of symbol point of IF 127. The symbol CLK 132 and demodulation CLK 134 are taken in the timing adjusting section 126.

Here, the control section 109 stores, in advance, a numerical value according to the amount of timing shift between IF 127 and RSSI 127a.

(amount of shift):$T = \text{(stored numerical value)} \times (1/2.688 \text{ MHz}) \, \mu s$ (1)

A numerical value calculated by expression 1 above based on the shift time between the IF 127 and RSSI 127a is stored in the control section 109. The numerical value stored is output as adjusting value 136 from the control section 109 to the timing adjusting section 126.

The timing adjusting section 126 starts counting at the rise of symbol CLK 132 so as to count demodulation CLK 134 by a number corresponding to the adjusting value 136 designated by the control section 109. After finishing the count, it outputs the trigger 135 to the A/D converter 114.

The A/D converter 114 converts RSSI voltage of RSSI 127a into a digital value at the timing of trigger 135, and outputs to the control section 109. The control section 109 uses the digitalized RSSI 127a in decoding, thereby the playback of excellent voice/sound is performed.

Thus, in this embodiment of the invention, when the trigger to indicate the symbol point of RSSI 127a is output from the demodulation section 103A that demodulates IF 127 received through the antenna 101 and outputs receive data, the A/D converter 114 outputs digitalized voltage of RSSI 127a at the timing of trigger. Therefore, the signal level can be measured precisely at the timing of symbol point, thereby the playback of excellent voice/sound can be performed.

Although in this embodiment the invention is applied to digital portable telephone unit, the invention can be also applied to another communications system using RSSI.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A digital portable telephone unit, comprising:
   an antenna through which signal is transmitted and received;
   a radio section which conducts the frequency conversion of signal and outputs IF (intermediate frequency) and RSSI (receive signal strength indicator);
   a demodulation section which demodulates the IF to output receive data;
   an A/D converter which outputs digitalizing the voltages of RSSI; and
   a control section which receives the receive data and outputs audio signal;
   wherein said demodulation section outputs a trigger to indicate a symbol point of RSSI to said A/D converter, whereby said demodulation section demodulates IF according to a timing shift between the IF and RSSI.

2. A digital portable telephone unit, according to claim 1, wherein said demodulation section comprises:
   a demodulation CLK section which outputs a demodulation CLK using a reference frequency;
   a CLK regenerative section which outputs a symbol CLK and a DATA CLK by frequency-dividing the demodulation CLK;
   a phase detection section which uses the reference frequency as a clock and outputs the phase of IF as phase DATA at a timing of the symbol CLK;
   a DATA playback section which produces demodulated data based on the phase DATA and outputs the data to said control section; and
   a timing adjustment section which starts counting the demodulation CLK at a rise of the symbol CLK, and at the time of finishing the count of a predetermined number, outputs the trigger.

3. A digital portable telephone unit, according to claim 2, wherein:
   said control section outputs an adjustment value corresponding to the shift amount of timing between the IF and the RSSI to said timing adjustment section; and
   said timing adjustment section conducts the count based on said adjustment value.

4. A digital portable telephone unit, according to claim 1, wherein:
   said A/D converter digitalizes the voltage of RSSI at the timing of said trigger and outputs it to said control section.

5. A method for playing back voice/sound, comprising:

first step of conducting the transmission/reception of signal;

second step of conducting the frequency conversion of signal and outputting IF (intermediate frequency) and RSSI (receive signal strength indicator);

third step of demodulating the IF to output receive data;

fourth step of outputting digitalizing the voltage of RSSI;

fifth step of processing the received data to output audio signal; and sixth step of outputting a trigger to indicate a symbol point when digitalizing the voltage of RSSI, whereby said third step of demodulating said IF is according to an amount of timing shift between the IF and RSSI.

6. A method for playing back voice/sound, according to claim 5, wherein, said third step includes:

seventh step of outputting a demodulation CLK using a reference frequency;

eighth step of outputting a symbol CLK and a DATA CLK by frequency-dividing the demodulation CLK;

ninth step of providing a reference frequency as a clock and outputting the phase of IF as phase DATA at a timing of the symbol CLK; and tenth step of outputting producing demodulated data based on the phase DATA; and said sixth step includes:

eleventh step of starting counting the demodulation CLK at a rise of the symbol CLK, and at the time of finishing the count of a predetermined number, outputting the trigger.

7. A method for playing back voice/sound, according to claim 6, wherein said eleventh step includes:

twelfth step of taking in an adjustment value corresponding to the shift amount of timing between the IF and the RSSI; and thirteenth step of conducting the count based on said adjustment value.

8. A method for playing back voice/sound, according to claim 5, wherein said fourth step includes:

fourteenth step of outputting digitalizing the voltage of RSSI at the timing of said trigger.

\* \* \* \* \*